United States Patent Office 3,449,257
Patented June 10, 1969

3,449,257
BRIGHTENER COMPOSITIONS
Robert J. Tuite and Donald N. Miller, Rochester, N.Y., assignors to Eastman Kodak Company, Rochester, N.Y., a corporation of New Jersey
No Drawing. Filed Nov. 3, 1966, Ser. No. 591,705
Int. Cl. C09k 1/10, 1/02
U.S. Cl. 252—301.2    18 Claims This invention relates to optical brightening compositions and more particularly to compositions comprising hydrophobic polymers and nonmigrating optical brighteners and to paper supports coated with said compositions.

The white areas of photographic prints and other products such as fibrous and plastic articles are often made to look whiter by incorporating optical brightening agents. The optical brightening agents fluoresce on irradiation with U.V. (ultraviolet) light, emitting visible light, usually bluish in hue thus enhancing the whiteness of the object. Optical brightening agents for use in photographic print materials must absorb U.V. light especially in the region from 360 to 400 m$\mu$ and efficiently convert this invisible light into visible light to enhance the whiteness and they must have the desired brightening power. The optical brighteners must also be stable to the temperatures as high as 590–625° F. used in incorporating them in plastics and in extruding the plastic materials in the desired form such as fibers, sheets, etc., if they are to be of any value in the finished product. Furthermore, the optical brighteners must be nonmigrating so that they remain in the plastic material where they are needed and do not exude as a surface film on the plastic which readily transfers to any other surface contacted with it. Since available optical brightener compositions generally do not exhibit all of these properties to the desired degree, new brightener compositions are needed.

It is therefore an object of our invention to provide novel hydrophobic polymer-optical brightening agent compositions in which the optical brightener has good stability at the 590–625° temperatures required for extrusion of the compositions.

Another object is to provide novel hydrophobic polymer optical brightening agent compositions which absorb U.V. light especially in the 360 to 400 m$\mu$ range and which give a high level of brightening.

Another object is to provide novel hydrophobic polymer-brightening agent compositions in which optical brighteners are nonmigrating as well as strong brightening agents that have good stability to the temperatures required for extruding the composition.

Another object is to provide a photographic support material comprising paper coated with a layer of our novel hydrophobic polymer-optical brightening agent compositions.

Still other objects will become evident from a consideration of the following specification and claims.

These and other objects are accomplished according to our invention by the preparation and use of our novel hydrophobic polymer-optical brightening agent compositions comprising (1) a hydrophobic polymer and (2) as a nonmigrating optical brightening agent a 2-(nuclear substituted benzoxazolyl)-5-(nuclear substituted benzoxazolyl)thiophene in which the benzene ring of each benzoxazolyl group has as nuclear substituents from 2 to 4 alkyl groups, each of said alkyl groups having preferably from 1 to 22 carbon atoms, such that at least one of the said alkyl group substituents on each of said benzene rings has more than 1 carbon atom.

Included among the novel brightening compositions of our invention are those comprising (1) a hydrophobic polymer and (2) a nonmigrating optical brightening agent advantageously represented by the following Formula I:

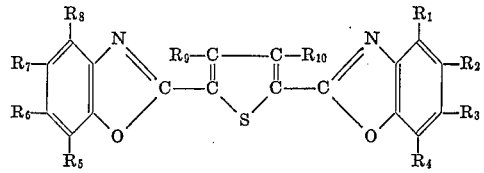

wherein $R_1$, $R_2$, $R_3$, $R_4$, $R_5$, $R_6$, $R_7$ and $R_8$ are the same or different and each represent hydrogen, or an alkyl group, preferably an alkyl group having from 1 to 22 carbon atoms, e.g., methyl, benzyl, phenethyl, butyl, t-butyl, amyl, t-amyl, cyclopentyl, n-hexyl, cyclohexyl, decyl, pentadecyl, octadecyl, dodecyl, docosyl, etc., such that at least two of $R_1$, $R_2$, $R_3$, and $R_4$ are alkyl groups and at least one of these two alkyl groups have more than 1 carbon atom, and such that at least two of $R_5$, $R_6$, $R_7$ and $R_8$ are alkyl groups and at least one of these two alkyl groups have more than 1 carbon atom; and $R_9$ and $R_{10}$ are the same or different and represent hydrogen, an alkyl group, preferably having from 1 to 15 carbon atoms, e.g., methyl, benzyl, butyl, t-butyl, amyl, decyl, pentadecyl, etc., or an aryl group, e.g., phenyl, tolyl, ethylphenyl, etc.

Our novel hydrophobic polymer-optical brightening agent compositions provide an important technical advance since they have good brightening properties that are not significantly reduced by the temperatures required for extrusion into sheets, fibers, etc., and since our optical brightening agents do not migrate from the composition.

Our compositions are prepared by heating the hydrophobic polymer to its softening point and then adding while mixing, the appropriate amount of our brightening agent. The brightening agent may be added as a finely divided powder or in a mixture with a small amount of the hydrophobic polymer prepared in advance. Our brightening agent is intimately mixed into the softened hydrophobic polymer producing a homogenous continuous phase composition which can be extruded into the desired form. Our brightening agents are used to advantage in our compositions over a concentration range of from about .001% to about .25% by weight with a preferred concentration in the range from about .01% to about .25%. The optimum concentration can be established by methods well known in the art.

In one embodiment our novel compositions are formed into sheets, fibers or objects of other shapes. In another very important embodiment our compositions are extruded as a film coating on paper that is used advantageously as a support for photographic print material.

Included among the hydrophobic polymers used to advantage according to our invention are the polyolefins, e.g., polyethylene, polypropylene, polystyrene, etc.; the polyesters, e.g., polyethylene terephthalate, etc.; the polysulfones; the polyurethanes; the polycarbonates; cellulose esters, e.g., cellulose acetate, cellulose propionate, cellulose butyrate, cellulose acetate propionate, etc.; the polyvinyls, e.g., polyvinyl chloride, polyvinylidene chloride, polyvinylidene fluoride, etc., the polyacrylates, e.g., polymethylmethacrylate, etc.; and copolymers, terpolymers, etc. of the above polymers.

Included among the non-wandering brightening agents used according to our invention are the following representative examples which are not to limit our invention.

(1) 2,5-bis(5,7-di-t-amylbenzoxazoyl)-3,4-diphenylthiophene
(2) 2,5-bis(5,7-di-n-amylbenzoxazoyl)thiophene
(3) 2,5-bis(5,7-di-t-amylbenzoxazolyl)thiophene
(4) 2,5 - bis(5,7-di-t-amylbenzoxazoyl)-3,4-dimethylthiophene (5) 2,5-bis(5,7-di-n-octylbenzoxazolyl)thiophene
(6) 2,5 - bis(5-pentadecyl-7-methylbenzoxazolyl)thiophene
(7) 2,5-bis(5,7-di-butylbenzoxazolyl)thiophene
(8) 2,5-bis(4,6,7-tri-t-amylbenzoxazolyl)thiophene
(9) 2,5-bis(5-ethyl-7-cyclohexyl)thiophene
(10) 2,5 - bis[5-propyl-7-(α-methylpropyl)] - 3,4 - dimethyl thiophene
(11) 2,5-bis(5-benzyl-7-ethyl)thiophene
(12) 2,5 - bis(4,5,6,7-tetra-n-amylbenzoxazolyl)thiophene
(13) 2 - (5-butyl-7-ethylbenzoxazolyl) - 5 - (5,7-di-t-amylbenzoxazoyl)thiophene
(14) 2 - (5,7-di-t-amylbenzoxazolyl) - 5 - (5-ethyl-7-propylbenzoxazolyl)thiophene
(15) 2 - (5,7-dipentadecylbenzoxazolyl) - 5 - (7-cyclopentyl-5-methyl)thiophene
(16) 2 - (5,7-di-t-butylbenzoxazolyl) - 5 - (5,7-dipropylbenzoxazolyl)thiophene
(17) 3-methyl-2,5-di-t-amylbenzoxazolyl)thiophene In general the novel non-wandering brightening agents of our invention are prepared by reacting the appropriately substituted o-aminophenol. The resulting compound advantageously represented by Formula II:

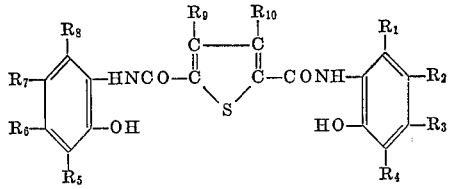

wherein $R_1$, $R_2$, $R_3$, $R_4$, $R_5$, $R_6$, $R_7$, $R_8$, $R_9$ and $R_{10}$ are as defined previously, is then converted to the corresponding compound of Formula I by heating to an elevated temperature advantageously in the presence of boric acid.

The appropriately substituted o-aminophenols used in the above reaction to prepare the compounds corresponding to Formula (II) are, in general, prepared by nitrating the phenols in accordance with the process disclosed in U.S. Patent 2,207,727, or that described in J.A.C.S., 76, 4987 (1954). The nitrophenol intermediate thus formed is then catalytically reduced to the corresponding aminophenol.

The following specific examples describe in detail the preparation of several of the typical compounds of our invention.

EXAMPLE 1

Preparation of compound 3

(A) Intermediate 2-amino-4,6-di-t-amylphenol.—A solution of 234 g. (1.0 mole) of 2,4-di-t-amylphenol in 600 ml. of glacial acetic acid was stirred at 10–12°, while 127 ml. of nitric acid diluted with 190 ml. of water was added, dropwise, over a three-hour period. Agitation of the mixture was continued for an additional hour, allowing the temperature to rise to 20° C. The reaction mixture was then poured into 6 liters of water (10–12° C.), and the aqueous layer decanted. The crude product was dissolved in 6 liters of ether, neutralized with 2% NaHCO₃ solution, washed with water, and dried over MgSO₄. The residue obtained on evaporation of the solvent was dissolved in 1200 ml. of ethanol and divided equally among 6 bottles of a Burgess-Barr reduction apparatus. Raney nickel catalyst (0.3–0.5 g.) was added to each bottle, and the mixture was shaken at room temperature in an atmosphere of hydrogen under an initial pressure of 50 p.s.i. until no more hydrogen was taken up. The reduction mixture was heated on a steam bath to dissolve the white solid that had separated; the catalyst was then removed by suction filtration. The filtrate was concentrated to dryness under diminished pressure. Recrystallization of the residue from ligroin (B.P. 66–75° C.) gave 102 g. of white needles, M.P. 136–138° C.

(B) Preparation of the final product, compound 3.—To a stirred mixture of 9.6 g. of the above intermediate 2-amino-4,6-di-t-amylphenol, 200 ml. of acetic acid, and 3.2 g. of anhydrous sodium acetate was added over a one-minute period 4.0 g. of thiophene-2,5-dicarbonyl chloride (J. M. Griffing and L. F. Salisbury, J.A.C.S., 70, 3418 (1948)) dissolved in 50 ml. of acetic acid. The temperature of the reaction mixture rose from 25° to 30° C.; the whole was heated to 45° for one-half hour and then allowed to cool to room temperature. The product which separated was collected by filtration, transferred to a beaker, and stirred for 20 minutes with 100 ml. of water. The insoluble bis-amido intermediate was collected by filtration, washed with 50 ml. of cold methanol, and air dried, yielding 9.0 g. of solid, M.P. 238–240° C.

An intimate mixture of 8.0 g. of the bis-amido compound and 0.4 g. of boric acid in a 200 ml. Berzelius-type beaker was hand-stirred for 45 minutes under nitrogen while being heated above its melting point (oil bath temperature 255° C.). Stirring and heating was stopped after bubbling ceased. The cooled melt was dissolved in 125 ml. of chloroform and washed with water. The organic layer was stirred with anhydrous sodium sulfate and 1.0 g. of Darco decolorizing charcoal and filtered. The filtrate was concentrated to dryness under reduced pressure. Two recrystallizations of the residue from ethyl alcohol gave 5.3 g. white crystals, M.P. 140–141°.

EXAMPLE 2

Preparation of compound 2

(A) Intermediate 2,4-di-n-amyl-6-nitrophenol.—To a stirred mixture of 30 ml. of concentrated nitric acid diluted with an equal volume of water containing a trace of sodium nitrite was added, dropwise, over a two-hour period, a solution of 93.6 g. (0.4 mole) of 2,4-di-n-amylphenol in 150 ml. of benzene, the temperature being kept below 10° C. by external cooling. Agitation of the mixture was continued for an additional hour at 15–18° C. The organic layer was separated, washed with water, dried, and concentrated. The oily residue gave 79.4 g. of dark red oil, B.P. 152–155° C./0.5 mm.

(B) Intermediate 2-amino-4,6-di-n-amylphenol hydrochloride.—A mixture of 27.9 g. of intermediate A above, 260 ml. of ethyl acetate, and 0.5–1.0 g. of 10% Pd/carbon catalyst was treated in the manner described under Example 1. The theoretical amount of hydrogen was absorbed in one hour. The hydrochloride obtained by passing hydrogen chloride into the cooled solution of the amine in acetonitrile (250 ml.) melted at 196–198° C., and yielded 21.2 g.

(C) Preparation of the final product, compound 2.—A mixture of intermediate B above, 350 ml. of acetic acid, 14.0 g. of anhydrous sodium acetate, and 8.4 g. of thiophene-2,5-dicarbonyl chloride was treated in the manner described under Example 1. Distillation of the crude reaction product, B.P. 312–315° C./0.5 mm., followed by recrystallization from alcohol gave white crystals, M.P. 45–48° C.

EXAMPLE 3

Preparation of compound 1

A mixture of 5.9 g. of 2-amino-4,6-di-t-amylphenol, 100 ml. of acetic acid, 2.0 g. of anhydrous sodium acetate, and 4.2 g. of 3,4-diphenylthiophene-2,5-dicarbonyl chloride (J.A.C.S., 70, 3418 (1948))[1] was processed in the manner described under Example 1. The reaction product after two recrystallizations from ethyl alcohol and final recrystallization from acetic acid yielded white crystals, M.P. 222–224° C.

---

[1] The 3,4-diphenylthiophene-2,5-dicarboxylic acid used to make the acid chloride was prepared from benzil and diethylthiodiacetate by the method described in J.A.C.S., 72, 4860 (1950). The mechanism of the reaction is discussed in J.A.C.S., 87, 1739 (1965).

EXAMPLE 4

Compound 4 was prepared by a synthesis similar to that described for compound 1 excepting that an equimolar amount of 3,4-dimethylthiophene-2,5-dicarboxylic acid was used in place of 3,4-diphenylthiophene-2,5-dicarboxylic acid.

Compounds 5, 6, 7, 8, 9, and 11 are advantageously prepared by syntheses similar to that used for compound 2 but in which equimolar amounts of the substituted o-aminophenols indicated in the following table are used in place of 2,4-diamyl-6-nitrophenol.

| Compound: | Substituted o-aminophenol |
|---|---|
| 5 | 2-amino-4,6-dioctylphenol. |
| 6 | 2-amino-6-methyl-4-pentadecylphenol. |
| 7 | 2-amino-4,6-di-butylphenol. |
| 8 | 2-amino-3,5,6-tri-t-amylphenol. |
| 9 | 2-amino-6-cyclohexyl-4-ethylphenol. |
| 11 | 2-amino-4-benzyl-6-ethylphenol. |

Compound 12 is advantageously prepared as follows: 1,2,3,4-tetra-n-amylbenzene is reacted with nitric acid to give the mononitro derivative which is then reduced to the corresponding amine. The amine derivative is then treated with nitrous acid, followed by hydrolysis using procedures well known in the art to make 2,3,4,5-tetra-n-amylphenol which is then nitrated and the nitro group reduced to the amine as before. The 6-amino-2,3,4,5-tetra-n-amylphenol is then condensed with thiophene diacid chloride yielding a diamide which upon heating in a vacuum gives compound 12.

Compound 10 is advantageously prepared by a synthesis similar to that used for making compound 1 except that an equimolar amount of 2-amino-4-propyl-6-(α-methylpropyl)phenol is used in place of 2-amino-4,6-di-t-amylphenol and an equimolar amount of 3,4-dimethylthiophene-2,5-dicarbonyl chloride is used in place of 3,5-diphenylthiophene-2,5-dicarbonyl chloride.

Compound 13 is advantageously prepared as follows: thiophene-2,5-dicarboxylic acid is treated with thionyl chloride to form the thiophene diacid chloride which is isolated and treated with an excess of phenol in slightly alkaline solution to yield the diester. The monoester is obtained by partial hydrolysis of the diester, then the free carboxylic acid group of the monoester is transformed into the acid chloride by treatment with thionyl chloride. The acid chloride derivative is reacted with 4-butyl-2-ethyl-6-aminophenol to give the corresponding monoamide which is then reacted under more vigorous conditions with 2,4-di-t-amyl-6-aminophenol to give an intermediate which, upon heating in a vacuum provides compound 13.

Compounds 14, 15 and 16 are prepared by syntheses similar to that used for making compound 13 but in which equimolar amounts of the substituted aminophenols indicated in the following table as A are used in place of 4-butyl-2-ethyl-6-aminophenol to make the corresponding monamide, and the substituted aminophenols indicated in the table as B are used in place of 2,4-di-t-amyl-6-aminophenol to make the diamide.

| Compound | Aminophenol A | Aminophenol B |
|---|---|---|
| 14 | 2-amino-4,6-di-t-amyl-phenol. | 2-amino-4-ethyl-6-propyl-phenol. |
| 15 | 2-amino-4,6-di-pentadecyl-phenol. | 2-amino-4-methyl-6-cyclopentylphenol. |
| 16 | 2-amino-4,6-di-t-butyl-phenol. | 2-amino-4,5-di-propyl-phenol. |

By a similar procedure, compound 17 is prepared from the diacid chloride of 3-methyl-2,5-thiophenedicarboxylic acid (British Patent 917,854 (1963)) and 2-amino-4,6-di-t-amylphenol.

In addition to exhibiting excellent and long-lasting fluorescence, it is their nonmigrating characteristic which makes the immediate brightening agents eminently suited for incorporation in our novel hydrophobic polymer—brightening agent compositions. In all instances where optical brighteners of the prior art had been incorporated in polyalkalene formulations designed to form a substrate on a photographic paper support, the brightener exuded to the surface of the coating. This exudation has been evident on the coatings within a short time after extrusion and continues to increase indefinitely. The exuded layer of brightener has been of sufficient thickness to be easily wiped away and thereby causing in these areas a darker (less bright) surface when viewed under a U.V. light source. Such exudation not only gives rise to a non-uniform brightness of the reflection surface of the support but it also causes some of the brightening compounds to be transferred non-uniformly to the back side of the adjacent layer of paper when wound in roll form. This non-uniform transfer to the clear polyethylene back coat is evident under visible light as white bands in areas of intimate contact and relatively yellow bands in the areas of poor contact. Under U.V. light, the yellow bands exhibit a darker (less bright) mottled appearance.

The following examples will still further illustrate our invention and the unexpected advantages that our compositions provide over similar compositions that are outside our invention.

EXAMPLE 5

A polyethylene coating composition containing 10% by weight of titanium dioxide was divided into 53.9 gram portions. Each portion was compounded in a Banbury mixer at 300° F. with .12 gram of the optical brighteners listed in Table 1 and subsequently pressed into 10 mil thick sheets. Half of each sheet was reprocessed using a roller style measuring head at 625° F. and pressed into sheets. The resulting sheets were visually inspected under ultraviolet light and tested for exudation of brightener by rubbing the surface of each sheet with a white non-fluorescent glove and then observing the glove under the ultraviolet light. The results are summarized in the following table.

TABLE 1

| | Appearance Under U.V. Light | | | | |
|---|---|---|---|---|---|
| | Composition Processed at 300° F. | | Compositions processed at 625° F. | | |
| Brightening agent | Brightness | Exudation | Brightness compared to the same composition processed at 300° F. | Exudation | |
| (A) Outside invention | Bright | Substantial amounts | Much less bright | Substantial amounts | |
| (B) Outside invention | Very bright | do | Less bright | Do. | |
| (C) Outside invention | do | do | do | Do. | |
| (3) Of invention | do | None | No change | None. | |
| (D) Outside invention | do | Substantial amounts | Less bright | Substantial amounts. | |

The following table identifies the brightening agents indicated in the preceding table.

Compound brighteners:
- A _____ 7 - [β - (dimethylamino)ethylureido] - 3 - phenylcoumarin.
- B _____ 2,2' - [vinylenebis - (p - phenylene)] - 5,7 - di-t-amylbenzoxazole.
- C _____ 2,5 - bis(5 - t - butylbenzoxazolyl)thiophene.
- 3 _____ 2,5 - bis(5,7 - di - t - amylbenzoxazolyl)thiophene.
- D _____ 2,5 - bis(6 - n - pentadecylbenzoxazolyl) thiophene.

The results show that compound 3 of our invention does not exude from the polyethylene composition processed at either 300° or 625° F. This is very unexpected since closely related brightening agents C and D that are outside of our invention both exuded from the polyethylene composition which had been processed at both 300° and 625° F. Brightening agents A and B outside our invention also exuded from the polyethylene sheets. Increases in the processing temperature from 300 to 625° F. apparently decomposed brighteners A, B, C and D in the compositions outside our invention as evidenced by their loss in brightness while Brightener 3 of our invention showed no loss of brightness and apparently no thermal decomposition of Brightener 3. The valuable heat resistance and nonmigrating characteristics of our brightening agents or compositions illustrated here represents a substantial technical advance.

The observations summarized in Table 1 above were repeated after 7 months and showed that the brightening agents A, B, C and D had continued to exude from the coating sheets containing them while Brightener 3 of the invention showed no exudation.

EXAMPLE 6

A coating composition was made of polyethylene containing .2% of our Brightener 2 and 10% titanium dioxide using a Banbury mixer and this composition was processed into a sheet at 625° F. No exudation of Brightener 2 was observed from this sheet.

EXAMPLE 7

Relative radiance measurements (TAPPI, 48, 357 (1965)) were made of the sheets of polyethylene containing brightening agent 3 of our invention and of the sheets of polyethylene containing brightening agent C, as described in Example 5, when they were prepared and again after one year of storage. The radiance spectrum of the sheets containing our brightening agent 3 was virtually unchanged after one year of storage at room temperature (wavelength of maximum radiance at 430 m$\mu$). However, with brightening agent C, the short wavelength flank of the curve shifted bathochromically upon one year storage resulting in a shift at the maximum from 425 to 445 m$\mu$. This increased visible absorption of the sample outside of the invention was readily noticed as the yellow appearance of exuded brightening agent C. In contrast to this, the polyethylene sheets containing brightening agent 3 did not become discolored or yellow with aging. This example further illustrates the valuable and unexpected characteristic of our compositions. Similar results can be shown for still other compositions of our invention containing other hydrophobic polymers and other brightening agents used in the concentration range from about .001% to about 0.25% according to our invention.

EXAMPLE 8

Compositions were made according to our invention by mixing our brightening agent 3 at a concentration of .2% in each of the following: polyethylene terephthalate, a polysulfone, a polycarbonate, polypropylene, a polyacrylate copolymer, polystyrene, polyvinyl chloride, and polyethylene. No exudation of the brightening agent was observed from any of these samples after processing at 625° F. either initially or following 2 weeks storage. These samples contained no titanium dioxide or other pigment; however, similar results are obtained when our compositions contain such addenda as was illustrated in Example 5.

Usually when titanium dioxide is used in our compositions it is used in substantial concentrations such as in the range from about 3 to 15% by weight, preferably in the range from 10 to 15%. Other addenda used to advantage include barium sulfate, silicon dioxide, calcium carbonate, zinc oxide, colored pigments, e.g., blue pigments, magenta pigments, etc., and mixtures of pigments used at the appropriate concentration. Pigments used to advantage are stable to light and heat, and should be nonmigrating in the hydrophobic polymer.

EXAMPLE 9

Valuable photographic paper supports for reflection print materials are made according to our invention by coating an appropriate thickness of our hydrophobic polymer-brightening agent compositions on paper for photographic supports. Good adhesion of our compositions to both paper and light sensitive emulsion that is subsequently coated over our compositions is obtained by using technics well known in the art. The unexpected nonmigrating and thermal stability of the brightening agents in our compositions demonstrated (both with and without titanium dioxide) in the preceding examples is similarly exhibited in our coatings on our paper support materials. Rolls of our coated support material are stored for prolonged periods of time without showing exudation of our brightening agent.

Our hydrophobic polymer-brightening agent compositions are distinguished by their high degree of brightness, their good thermal stability, their freedom from yellowing and particularly the nonmigrating characteristic of our brighteners in the hydrophobic polymers. Since compositions comprising polyalkalenes and closely related brighteners that are outside our invention are inoperative because the brighteners exude from the composition, it is not obvious that our compositions would be free of brightener exudation. Our hydrophobic compositions are valuable for use in the manufacture of films, fibers and objects of various other forms. A particularly valuable use of our compositions is in a substrate for photographic paper supports for reflection print materials.

This invention has been described in detail with particular reference to preferred embodiments thereof but it will be understood that variations and modifications can be effected within the spirit and scope of the invention as described hereinabove and as defined in the appended claims.

We claim:
1. A composition comprising a hydrophobic polymer and a nonmigrating optical brightener having the formula:

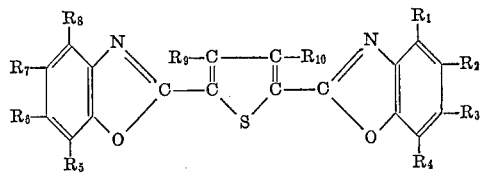

wherein $R_1$, $R_2$, $R_3$, $R_4$, $R_5$, $R_6$, $R_7$ and $R_8$ each represent a member selected from the class consisting of hydrogen and an alkyl group such that at least 2 of $R_1$, $R_2$, $R_3$, and $R_4$ are alkyl groups with at least 1 of these 2 alkyl groups having more than 1 carbon atom, and such that at least 2 of $R_5$, $R_6$, $R_7$ and $R_8$ are alkyl groups with at least 1 of these 2 alkyl groups having more than 1 carbon atom; and $R_9$ and $R_{10}$ are each selected from the class consisting of hydrogen, an alkyl group and an aryl group.

2. A composition of claim 1 containing titanium dioxide.

3. A composition of claim 1 in which the hydrophobic polymer is selected from the class consisting of a polyolefin, a polyester, a polyvinyl, a polyurethane, a polycarbonate, a polysulfone, a cellulose ester and a polyacrylate.

4. A composition of claim 1 in which the hydrophobic polymer is a polyolefin.

5. A composition of claim 1 in which the hydrophobic polymer is polyethylene.

6. A composition of claim 1 in which the nonmigrating optical brightener is 2,5-bis(5,7-di-t-amylbenzoxazolyl)thiophene.

7. A composition of claim 1 in which the nonmigrating optical brightener is 2,5-bis(5,7-di-n-amylbenzoxazolyl)thiophene.

8. A composition of claim 1 in which the nonmigrating optical brightener is 2,5-bis(5,7-di-t-amylbenzoxazolyl)-3,4-diphenyl thiophene.

9. A composition of claim 1 in which the nonmigrating optical brightener is 2,5-bis(5,7-di-t-amylbenzoxazolyl)-3,4-dimethylthiophene.

10. A composition of claim 1 in which the nonmigrating optical brightener is 2,5-bis(5,7-di-butylbenzoxazolyl)thiophene.

11. A composition of claim 1 in which the hydrophobic polymer is polyethylene and the nonmigrating optical brightener is 2,5-bis(5,7-di-t-amylbenzoxazolyl)thiophene.

12. An element comprising a paper support having a hydrophobic layer coated from a composition comprising a hydrophobic polymer and a nonmigrating optical brightener having the formula:

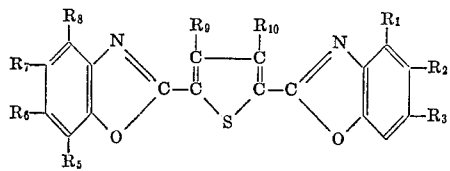

wherein $R_1$, $R_2$, $R_3$, $R_4$, $R_5$, $R_6$, $R_7$ and $R_8$ each represent a member selected from the class consisting of hydrogen and an alkyl group such that at least two of $R_1$, $R_2$, $R_3$ and $R_4$ are alkyl groups with at least one of these two alkyl groups having more than 1 carbon atom, and such that at least two of $R_5$, $R_6$, $R_7$ and $R_8$ are alkyl groups with at least 1 of these 2 alkyl groups having more than 1 carbon atom; and $R_9$ and $R_{10}$ are each selected from the class consisting of hydrogen, an alkyl group and an aryl group.

13. An element of claim 12 in which the hydrophobic polymer is selected from the class consisting of a polyolefin, a polyester, a polyvinyl, a polyurethane, a polycarbonate, a polysulfone, a cellulose ester and a polyacrylate.

14. An element of claim 12 in which the hydrophobic polymer is a polyolefin.

15. An element of claim 12 in which the hydrophobic polymer is polyethylene.

16. An element of claim 12 in which the said composition includes titanium dioxide.

17. An element of claim 12 in which the nonmigrating optical brightener is 2,5-bis(5,7-di-t-amylbenzoxazolyl) thiophene.

18. A paper support coated with a hydrophobic layer comprising polyethylene, 2,5 - bis(5,7-di-t-amylbenzoxazolyl)-thiophene and titanium dioxide.

References Cited

UNITED STATES PATENTS 3,178,445  4/1965  Maeder et al. _____ 260—307
3,135,762  6/1964  Maeder et al. _____ 260—307

TOBIAS E. LEVOW, *Primary Examiner.*

WATSON T. SCOTT, *Assistant Examiner.*

U.S. Cl. X.R.

117—33.5; 260—307.4; 252—301.3; 96—82

PO-1050
(5/69)

UNITED STATES PATENT OFFICE
CERTIFICATE OF CORRECTION

Patent No. 3,449,257     Dated June 10, 1969

Inventor(s) Robert J. Tuite and Donald N. Miller

It is certified that error appears in the above-identified patent and that said Letters Patent are hereby corrected as shown below:

Column 9, Claim 12, that portion of the formula reading

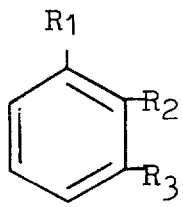     should read     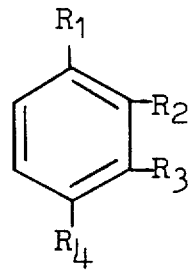

SIGNED AND
SEALED
AUG 18 1970

(SEAL)
Attest:

Edward M. Fletcher, Jr.
Attesting Officer

WILLIAM E. SCHUYLER, JR.
Commissioner of Patents